United States Patent [19]

Beernink et al.

[11] Patent Number: 5,710,831
[45] Date of Patent: Jan. 20, 1998

[54] METHOD FOR CORRECTING HANDWRITING ON A PEN-BASED COMPUTER

[75] Inventors: Ernest H. Beernink; Stephen P. Capps, both of San Carlos; John R. Meier; Frederich N. Tou, both of Cupertino, all of Calif.

[73] Assignee: Apple Computer, Inc., Cupertino, Calif.

[21] Appl. No.: 476,886

[22] Filed: Jun. 7, 1995

Related U.S. Application Data

[63] Continuation of Ser. No. 99,847, Jul. 30, 1993, abandoned.
[51] Int. Cl.⁶ ................................................ G06K 9/03
[52] U.S. Cl. ........................ 382/189; 382/311; 395/793
[58] Field of Search ................................ 382/189, 187, 382/186, 310, 309, 311, 179; 395/179, 792, 793, 795

[56] References Cited

U.S. PATENT DOCUMENTS

| | | | |
|---|---|---|---|
| 4,058,795 | 11/1977 | Balm | 340/146.3 |
| 4,653,107 | 3/1987 | Shojima et al. | 382/13 |
| 4,680,804 | 7/1987 | Kuzunuki et al. | 382/13 |
| 4,727,588 | 2/1988 | Fox et al. | 382/13 |
| 4,739,317 | 4/1988 | Berry et al. | 340/723 |
| 4,812,832 | 3/1989 | Oishi et al. | 340/709 |
| 4,933,865 | 6/1990 | Yamamoto et al. | 364/518 |
| 4,972,496 | 11/1990 | Sklarew | 382/187 |
| 4,992,630 | 2/1991 | Mletzko | 178/18 |
| 5,034,989 | 7/1991 | Loh | 382/13 |
| 5,038,382 | 8/1991 | Lipscomb | 382/13 |
| 5,121,442 | 6/1992 | Togawa et al. | 382/13 |
| 5,157,737 | 10/1992 | Sklarew | 382/13 |
| 5,191,622 | 3/1993 | Shojima et al. | 382/13 |
| 5,197,107 | 3/1993 | Katsuyama et al. | 382/30 |
| 5,313,527 | 5/1994 | Gruberman et al. | 382/186 |
| 5,325,447 | 6/1994 | Vogt, III | 382/102 |
| 5,455,901 | 10/1995 | Friend et al. | 382/187 |

FOREIGN PATENT DOCUMENTS 383304 8/1990 European Pat. Off. .

OTHER PUBLICATIONS

O Connor, Rory J., Apple Banking on Newton s Brain, Apr. 22, 1992 San Jose Mercury News.
Weiman, Liza and Moran, Tom, A Step Toward the Future, Aug. 1992, MacWorld Magazine.
Soviero, Marcelle M., Your World According to Newton, Sep. 1992 Popular Science Magazine.
Abatemarco, Fred, From the Editor, Sep. 1992, Popular Science Magazine.
Macintosh User s Guide, 1991.

*Primary Examiner*—Michael T. Razavi
*Assistant Examiner*—Jon Chang
*Attorney, Agent, or Firm*—Hickman Beyer & Weaver

[57] ABSTRACT

A method for correcting textual material recognized on a pen-based computer in accordance with the present invention includes the step of receiving an input on a screen of the computer system. The input is then recognized, and a bounding box defining the bounds of the input is defined. A determination of the intention and placement of the recognized input is then made according to the relationship between the bounding box of the recognized input and the bounding boxes of the already existing textual objects. When a substantial overlap is found of the recognized input with an existing textual object and the number of characters of the recognized input is less than a predetermined number, the recognized input is considered as an overwrite of the existing text. If the conditions are not met, the recognized input is considered as an insertion of a new textual object, i.e., a new word. A best potential character is determined from the recognized input if the overwrite conditions are met, and the most overlapped character of the overlapped textual object is replaced by the best potential character.

38 Claims, 10 Drawing Sheets w ┆o┆r m
w ┆a┆r m
w ┆9┆r m
w ┆q┆r m

METHOD FOR CORRECTING HANDWRITING ON A PEN-BASED COMPUTER

This is a continuation of application Ser. No. 08/099,847 filed on Jul. 30, 1993, now abandoned.

BACKGROUND OF THE INVENTION

The present invention relates generally to computer systems, and more particularly to input correction techniques on a pen-based computer.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of uniting the power of a general purpose computer with the functionality and small size of a personal organizer. A pen-based computer system is typically a small, hand-held computer where the primary method for inputting data includes a "open" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

The recognition of text inputted with the use of a pen is not foolproof, however. Due to the variations in handwriting from one user to another, even the most accurate recognition software can return results that are not correct. An attempt to lessen this problem involves the use of a "training" program that allows users to "teach" the computer their personal handwriting techniques. While this technique can reduce mistaken recognition of inputs, the training procedure is time-consuming and does not guarantee correct recognition for every input. Also, the computer would need to be "trained" for every user to achieve successful recognition for more than one user.

One correction technique requires the deletion and subsequent rewriting of the improperly recognized input. Reentering entire words is inefficient and time-consuming. Further, the rewritten input is not necessarily going to be recognized more accurately with subsequent attempts.

In view of the foregoing, a technique is needed that provides an efficient and accurate method for correcting handwriting recognition on a pen-based computer.

SUMMARY OF THE INVENTION

To achieve the foregoing and other objects and in accordance with the purpose of the present invention, a method for correcting textual material on a pen-based computer is described. In general, alterations of recognized handwriting input on a pen-based computer can be done in a timely and efficient manner.

A method for correcting textual material displayed on a display screen of a pen-based computer begins with the reception of input on the display screen. This input is then recognized, and a determination is made as to the intent and placement of the input. This determination indicates if the input is a word correction gesture and the location for placing the input when it is a word correction gesture. The input is then re-recognized in conjunction with the characteristics of the word being corrected. A best potential replacement character is determined based upon the result of the re-recognizing, which is then used to correct the word. The result of the replacement and correction is then displayed.

A further method for correcting textual material recognized on a pen-based computer in accordance with the present invention includes the step of receiving an input on a screen of the computer system. The input is then recognized, and a bounding box defining the bounds of the input is defined. A determination of the intention and placement of the recognized input is then made according to the relationship between the bounding box of the recognized input and the bounding boxes of the already existing textual objects. When a substantial overlap is found of the recognized input with an existing textual object and the number of characters of the recognized input is less than a predetermined number, the recognized input is considered as an overwrite of the existing text. If the conditions are not met, the recognized input is considered as an insertion of a new textual object, i.e., a new word. A best potential character is determined from the recognized input if the overwrite conditions are met, and the most overlapped character of the overlapped textual object is replaced by the best potential character.

By these methods, a convenient correction of recognized handwriting on a pen-based computer can be achieved. Additional steps of deleting and rewriting existing text often required for making corrections are eliminated with the implementation of this method. Further, the method allows characters to be appended either to the beginning or the end of an existing word without requiring the rewriting of the entire word.

These and other advantages of the present invention will become apparent upon reading the following detailed descriptions and studying the various figures of the drawings.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
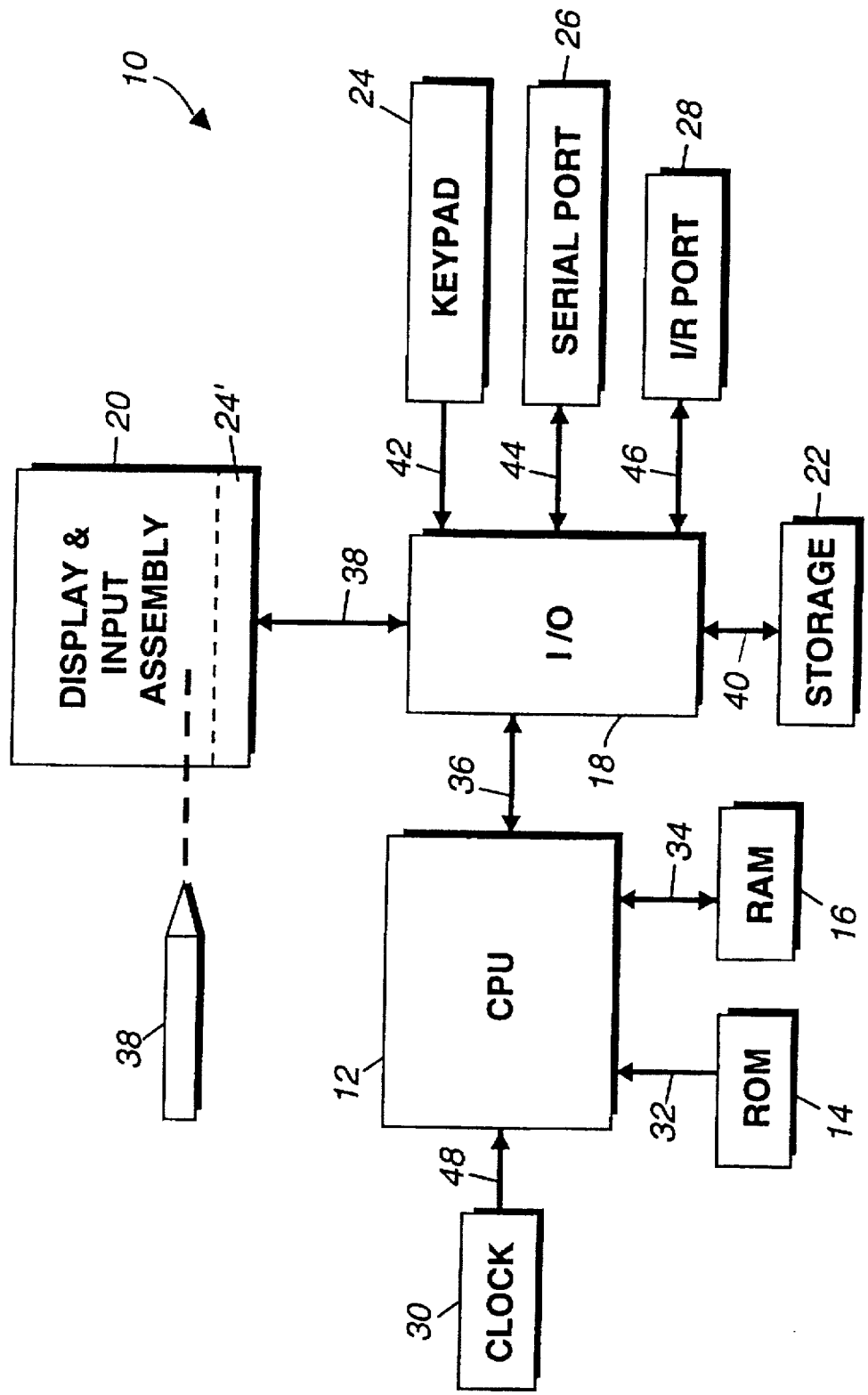
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

Figure 2A:
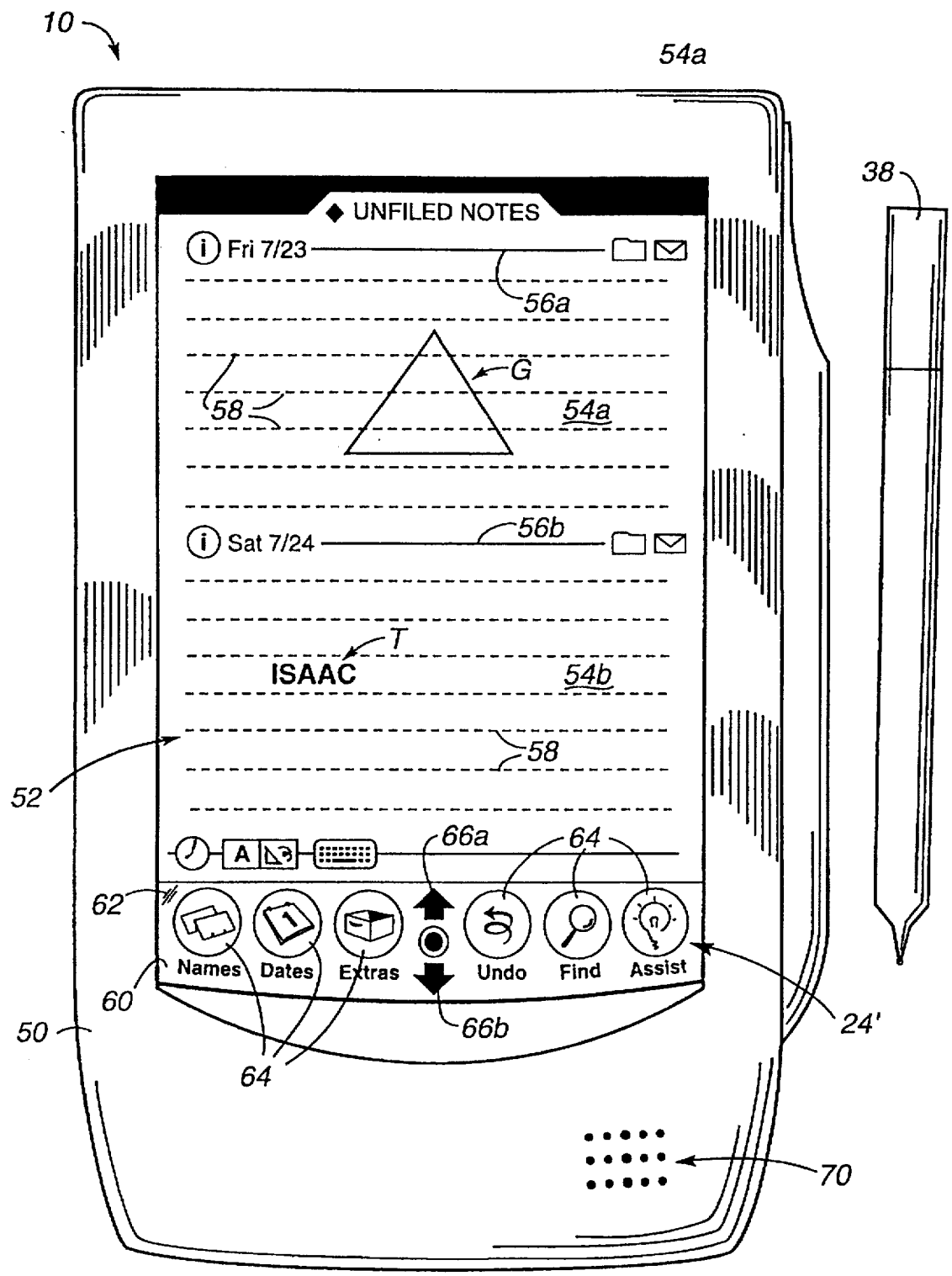
FIG. 2a is a top plan view of the screen, case, keypad, and stylus of the computer system of FIG. 1.

In FIG. 2a, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application 07/868,013, filed Apr. 13, 1992 on behalf of Tchao et al., assigned to the assignee of the present invention and incorporated herein by reference in its entirety.

The screen illustrated in FIG. 2a is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

Figures 2B, 2C:
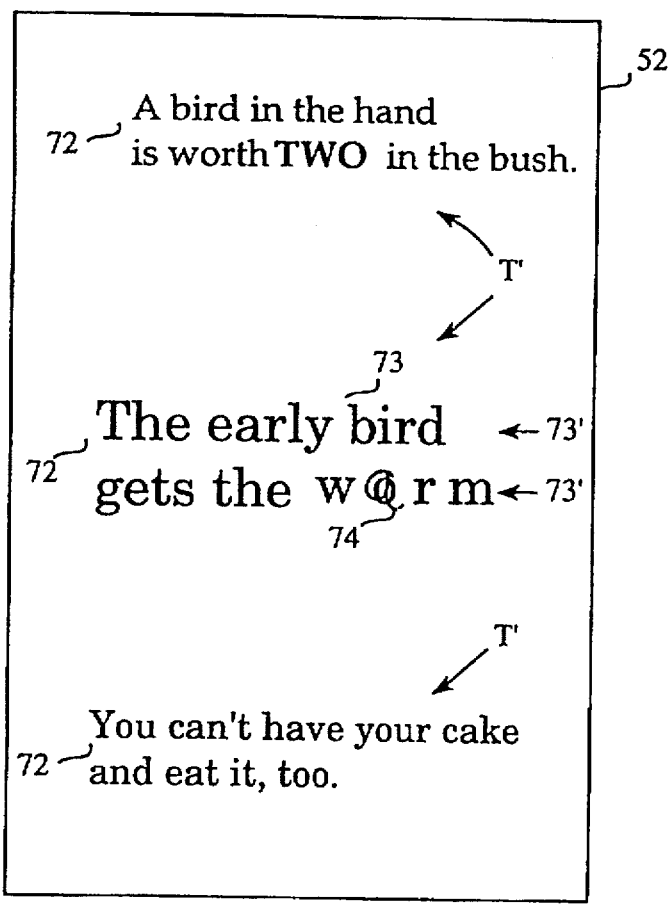
FIG. 2b illustrates a portion of the screen of FIG. 2a in which text has been entered.
FIG. 2c illustrates some possible interpretations of pen input in FIG. 2b.

FIG. 2b illustrates a portion of screen 52 in which a user has entered a plurality of text objects T' that have been recognized by the system's recognition engine as a plurality of paragraphs 72. The center paragraph 73, is conceptually divided into a plurality of lines 73'. As seen in FIG. 2b, for organizational purposes, the top paragraph may also be divided into multiple style runs (described in greater detail below with reference to FIG. 5a) wherein each style run is defined as a string of consecutive text that has the same attributes (i.e., the same font, the same text size and the same style of text, etc.). A suitable recognition engine for use in conjunction with this invention is described in co-pending U.S. patent application Ser. No. 08/068,443 filed on May 27, 1993, on behalf of Beemink, entitled "Method and Apparatus for Recognizing Handwritten Words", assigned to the assignee of the present invention, and incorporated herein by reference in its entirety. However, it should be appreciated that the actual recognition engine used may be varied widely without significantly affecting the advantages of the present invention.

Within one of the lines 73' of the recognized text the word "worm" has been recognized. However, for the purposes of illustration, we will assume that the intended input was the word "warm". To correct this mistake in accordance with the present invention, the user simply writes an "a" 74 on top of the displayed "o" to change the word from "worm" to "warm". After the user has written the letter "a" on the display screen 52, the system will first recognize the input and then attempt to re-recognize the word in view of the new input. The method used to accomplish this task will be described below with reference to FIGS. 3-10. It should be appreciated that due to the tremendous variations in penmanship that potential users may have, handwriting recognition is an imprecise art. Therefore, often when the recognition engine analyzes an input, it will return a plurality of potential interpretations along with some sort of ranking of the interpretations. By way of example, some possible interpretations of the handwritten input shown in FIG. 2b that may be returned by the recognizer are shown in FIG. 2c. As illustrated, the recognition engine produces a number of possible interpretations 76 of the "a" 74 input. These possible interpretations 76 are given as a list of characters ranging from the most probable to the least probable interpretation of the input. In this illustration, these characters range from "a" to "o" to "9" to "q". The determination of the intention of the overwrite must then be performed.

Figure 3:
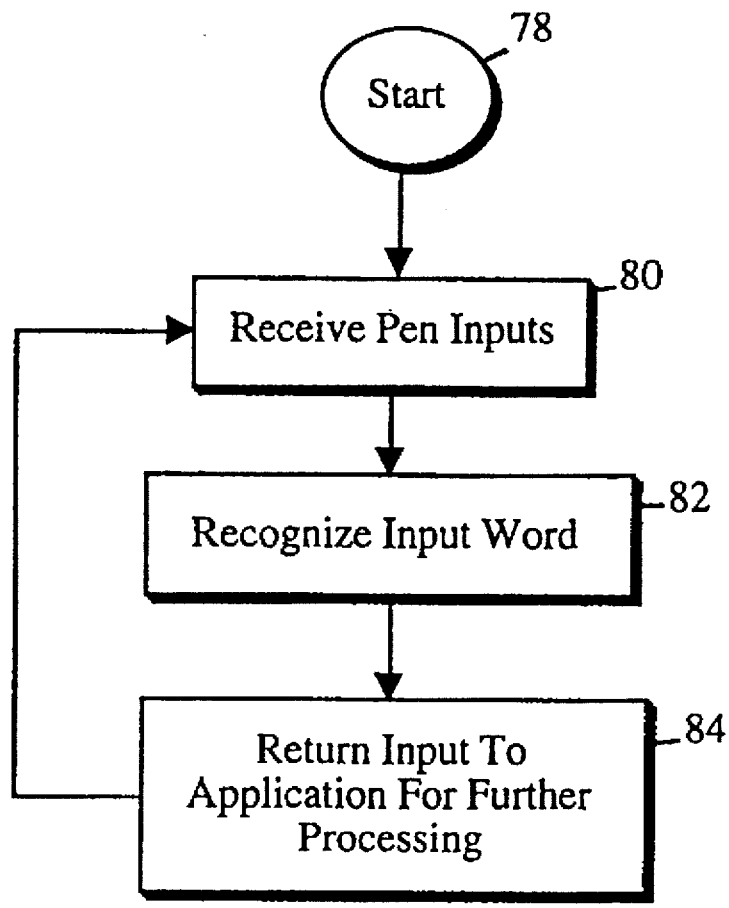
FIG. 3 is a flowchart illustrating a method for performing overwriting in accordance with the present invention.

The flowchart of FIG. 3 illustrates the overall steps of a method to perform character overwriting in accordance with the present invention. The process begins in step 78 and in step 80 the pen inputs are received. These pen inputs are recognized in step 82 as a word by a suitable recognition process. Again, a suitable recognizer is described in the aforementioned co-pending U.S. patent application Ser. No. 08/068,443. The results of these recognition processes are returned to the application for further processing in step 84, which is described in greater detail with reference to FIG. 4.

Figure 4:
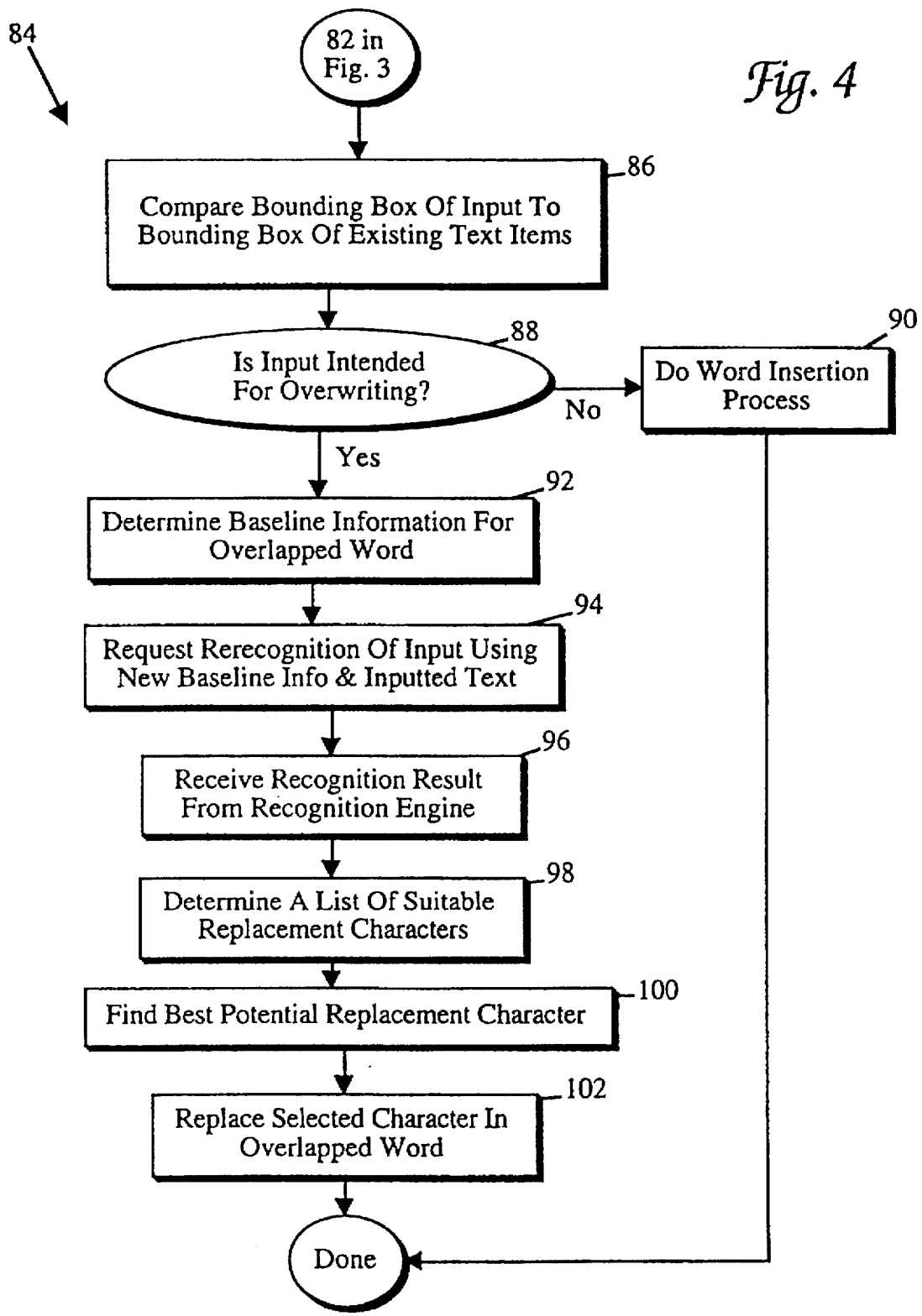
FIG. 4 is a flowchart illustrating steps involved in determining intent and placement of the input (step 84 of FIG. 3)

FIG. 4 illustrates the steps involved in the further processing of the input from step 84 of FIG. 3 to determine where the user intends to place the input. The process proceeds in step 86 by comparing the bounding box of the input to the bounding boxes of existing text on the screen 52. Bounding boxes are the rectilinear areas encompassing the text objects, and it is the x- and y-coordinates of the rectilinear areas that determine the bounds of the bounding boxes, and thus, the comparison of existing text to recognized input. The bounds of the bounding box may be the exact dimensions of the input text or may extend beyond the exact dimensions by one or more pixels, preferably extending 10 pixels more than the exact dimensions. After comparing the bounding boxes, the logic moves to step 88 to determine if the intent of the input is for overwriting within an existing text object. The details of this determination are described below with reference to FIG. 5. If overwriting is not the intended purpose, the input is processed as a word insertion in step 90 before the entire process is completed. The details of a suitable word inserting technique are given in co-pending U.S. patent application Ser. No. 08/070,096, filed on May 27, 1993 on behalf of Capps, et al, entitled "Method and Apparatus for Formatting Paragraphs", assigned to the assignee of the present invention, and incorporated herein by reference in its entirety.

When the logic determines that the user's input is intended to be an overwrite, the logic moves to step 92, where the baseline information of the word or text overlapped by the input is determined. This determination involves acquiring the character information for the chosen font from the graphics package and subsequently calculating the character baseline and body height based upon the paragraph position information of the paragraph of text overlapped by the input. A baseline is an imaginary horizontal line underlying the characters in a string of text that presents these characters evenly along lines similar to the lines used as guides in a ruled line of paper. Once the overlapped word's baseline information is determined, the logic moves to step 94, which requests re-recognition of the input based upon at least the baseline information and the input strokes, so that the input has the same attributes as the text it overlaps. More sophisticated recognizers may also utilize other characters in the word, or other words in the sentence to provide context to the input text. A list of suitable replacement characters or suitable replacement words is then determined in step 98, which will be described in more detail below with reference to the flowchart of FIG. 9. The best potential replacement character is then found in step 100. The process of determining a best potential replacement character is detailed in the flowchart of FIG. 10. Before the process is completed, the final step, step 102, uses the replacement character determined in step 100 to correct the overlapped word. The corrected word is then displayed, and the system is then ready to process a new input.

Figure 5:
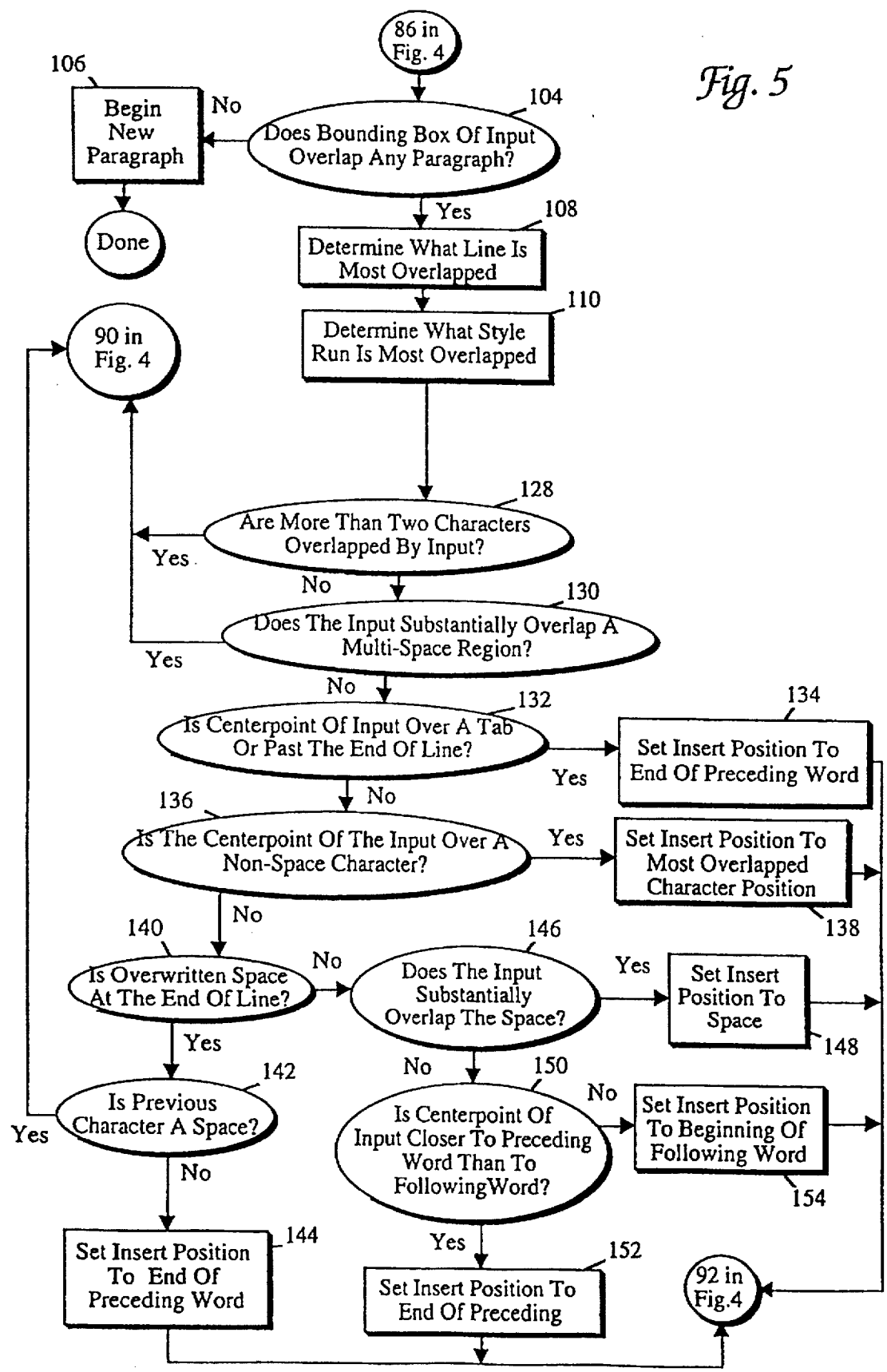
FIG. 5 is a flowchart illustrating input intent and placement in more detail (step 88 of FIG. 4)

Referring next to the flowchart in FIG. 5, the steps of determining the intent and placement of the input (step 88 of FIG. 4) will be described in more detail. The process begins in step 104 by determining if the bounding box of the input substantially overlaps the bounding boxes of any of the existing paragraphs. In this determination, a chosen percent of the input bounding box must overlap the bounding box of a paragraph to be considered overlapping. Fifty percent overlapping, i.e. fifty percent of the input bounding box lies within an existing paragraph bounding box, has been found to be a good chosen percentage, but other percentages of overlap may be successful as well. If no overlap is determined, the input is considered a new paragraph and the logic moves to step 106 where the input is treated as a new paragraph. A suitable method for beginning a paragraph is described in the aforementioned co-pending U.S. patent application Ser. No. 08/070,096. Thereafter, the process is completed. If the result of step 104 is the determination that bounding box does overlap an existing paragraph, the logic moves to step 108, which determines what line in the paragraph is overlapped. This step involves comparing the known y-coordinates of the line bounding boxes to the y-coordinates of the input bounding box. The line that contains the most of the input bounding box is treated as the most overlapped line. Once the line overlapped is determined, the style run most overlapped within the line is determined in step 110. Changing the font, adding a tab, italicizing a word, or altering the style of any text in a line separates the style runs within that line. Style runs are conceptually separated by imaginary vertical edges, so that the most overlapped style run is determined by comparing the x-coordinates of the imaginary vertical edges with the x-coordinates of the input bounding box.

Figure 5A:
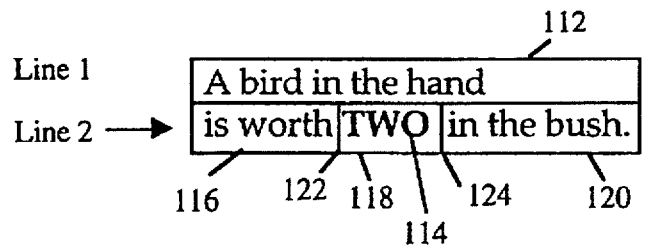
FIG. 5a is an illustration used to explain a style run.

An example of a style run is shown in FIG. 5a. Line 2 of paragraph 112 has a change in style with the all capitalized and bold word "TWO" 114. This change in style distinguishes 114 from the preceding and succeeding words in line 2, and thus, three style runs, 116, 118, and 120, are created in Line 2 and are separated by the imaginary vertical edges 122 and 124 between each style run. These style runs are distinguished by the character font, size, and style within each run. In this example, style run 116 contains characters of Palatino font, size 14, and normal style. Style run 118 contains characters of Palatino font, size 14, and a style of all bold. The style run 120 contains characters with the same attributes as style run 116, namely characters of Palatino font, size 14, and normal style. Therefore, to overwrite a character in the word "TWO" 114, the input must be placed substantially within the edges 122 and 124 of the style run 118.

Once the general location for placing the input is determined by these steps, the more specific location and intention determination can be performed. After determining the most overlapped style run, the logic moves to step 128, which determines if two or more existing characters are overlapped by the input. Details of this overlapping determination are described in more detail with reference in the flowchart of FIG. 6. If no more than two characters are overlapped, the logic moves to step 130, which determines if the input overlaps a multi-space region. By way of example, a multi-space region may be defined as at least three consecutive spaces within the overlapped line. The steps involved in this determination are described in more detail below with reference to FIG. 7. As long as the input does not substantially overlap more than two characters, the logic proceeds to step 132. If the logic step 128 or step 130 is true, i.e., more than two characters are overlapped or the input overlaps a multi-space region, then the interpretation is made that the input is intended as an insertion of a word, rather than as a correction of an existing word. The word insertion process, step 90 of FIG. 4, is then performed. If the determinations in each of step 128 and step 130 is not true, then the logic proceeds to step 132 which begins the next series of steps that determine the intended placement of the input within the existing text.

Step 132 determines if the centerpoint or midpoint of the input lies over a tab or past the end of a line (i.e. on a carriage return portion of a line). If the centerpoint is over a tab or the end of a line, the interpretation is that the input is intended to be placed at the end of the word preceding the tab or end of line, and the insertion position of the input is set to the end of the preceding word in step 134 before the process advances to step 92 (FIG. 4). Similarly, if the input centerpoint lies at the beginning of a line, the interpretation is that the input is intended to be placed at the beginning of the line, and the insert position is set to the beginning of the following word. With this arrangement, for example, in a table of tabbed entries, the tab itself would not be overwritten if the input overlies it, but the input would be appended appropriately to an entry proximate to the overwritten tab, since that is the more probable intention of the overwriting. The deletion of a tab would have to be performed by some other gesture, such as a scrub gesture as described in co-pending U.S. patent application Ser. No. 08/070,094 filed on May 27, 1993 on behalf of Capps, et al, entitled "Method for Deleting Objects on a Computer Display", assigned to the assignee of the present invention, and incorporated herein by reference in its entirety.

If the input is not over a tab or end of line as determined in step 132, the logic moves to step 136, where it determines if the centerpoint lies over a non-space character. When the centerpoint is over a non-space character, the position for insertion is set in step 138 for the most overlapped character position in the overlapped word as determined by comparing the location of the centerpoint to the location of the characters within the word. The process then advances to step 92 (FIG. 4). In an alternate embodiment, when the centerpoint of the input lies sufficiently near the midline between two adjacent non-space characters in a word, the input can be considered as an insert of a character between the two characters, rather than a correction of either character.

If the centerpoint is over a space, the logic moves to step 140 where it determines if the overwritten space is at the end of a line. Applicants have found that by increasing the size of the bounding box of the paragraph by preferably three or between three and five pixels in each direction over the actual boundaries of the text, it is easy to detect such inputs to the end of a line. If the centerpoint is over this space, the next step 142 is to determine if the character previous to this space is also a space character. If so, the input is interpreted as a word insertion and the process proceeds to step 90 (FIG. 4). If the preceding character is not a space, the position for insertion is set to end of the preceding word in step 144 before the process continues to step 92 (FIG. 4). If the space overwritten is not at the end of the line, step 146 checks for substantial overlapping of the space by the input. The details of this determination are provided in FIG. 8. If there is substantial overlap, the insert position is set to the overlapped space position in step 148, and the process proceeds to step 92 (FIG. 4). If the input does not substantially overlap the space, the logic moves to step 150 which determines whether the centerpoint is closer to the preceding or following word. The insert position is set to the end of the preceding word in step 152 if the centerpoint is closer to the preceding word. Conversely, if the centerpoint is closer to the following word, the insert position is set to the beginning of the following word in step 154. Upon completion of either step 152 or step 154 the process continues with step 92 of FIG. 4.

Figure 6:
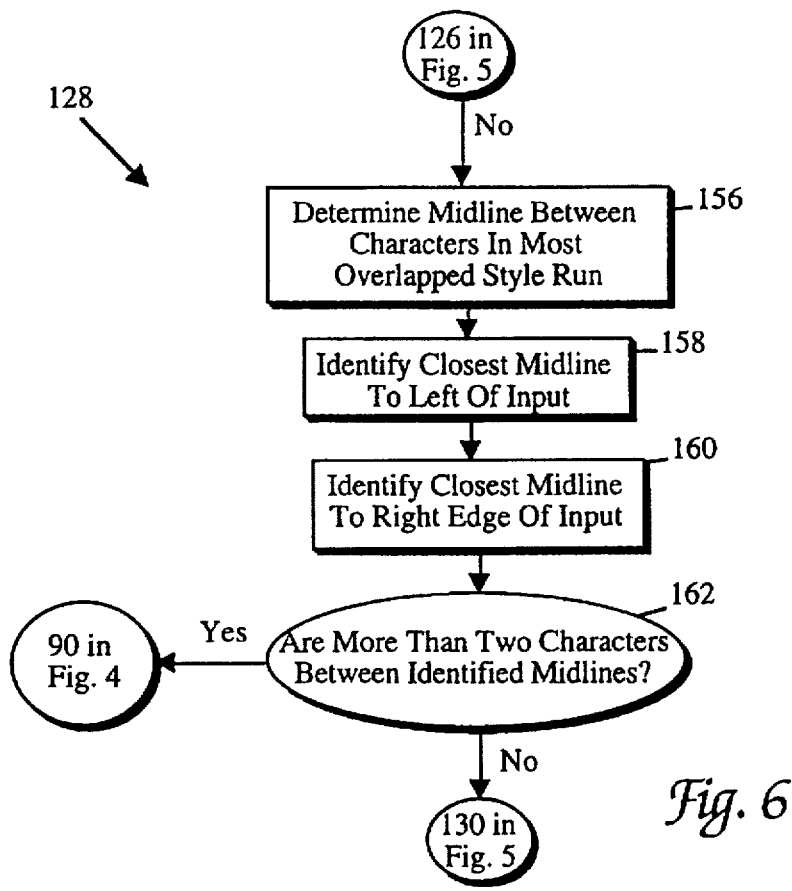
FIG. 6 is a flowchart illustrating the determination of more than two character overlap (step 128 of FIG. 5)

Referring next to FIG. 6, the steps involved in determining if more than two characters are overlapped by the input (step 128 in FIG. 5) will be described. The process begins in step 156 by determining the position of a midline between each of the characters in the most overlapped style run based upon the style run location within the overlapped line. The next step 158 identifies the midline closest to the left edge of the input bounding box. The closest midline to the right edge of the input bounding box is then determined in step 160. Thereafter, step 162 determines if more than two characters are contained between these right and left edges. If so, then more than two characters are overlapped, and the word insertion process in step 90 of FIG. 4 is performed. If not, then a character is substantially overlapped, and the insert position for placing the input can be set. It is noted that in circumstances where only one character is found between the right and left edges, the determination of the most overlapped character is obvious. However, when two characters are found between the right and left edges, it must be determined which is the most overlapped. As described above, this is accomplished by comparing the centerpoint of the input to the centerpoint of the overlapped character(s) to determine which character is substantially overlapped, and thus, the insert position of the input. Again, in an alternate embodiment, if two characters are overlapped, the input could be interpreted as an insert of the input between the two characters, rather than an overwrite of either character. Once the determination is completed, the logic then continues with step 130 of FIG. 5.

Figure 7:
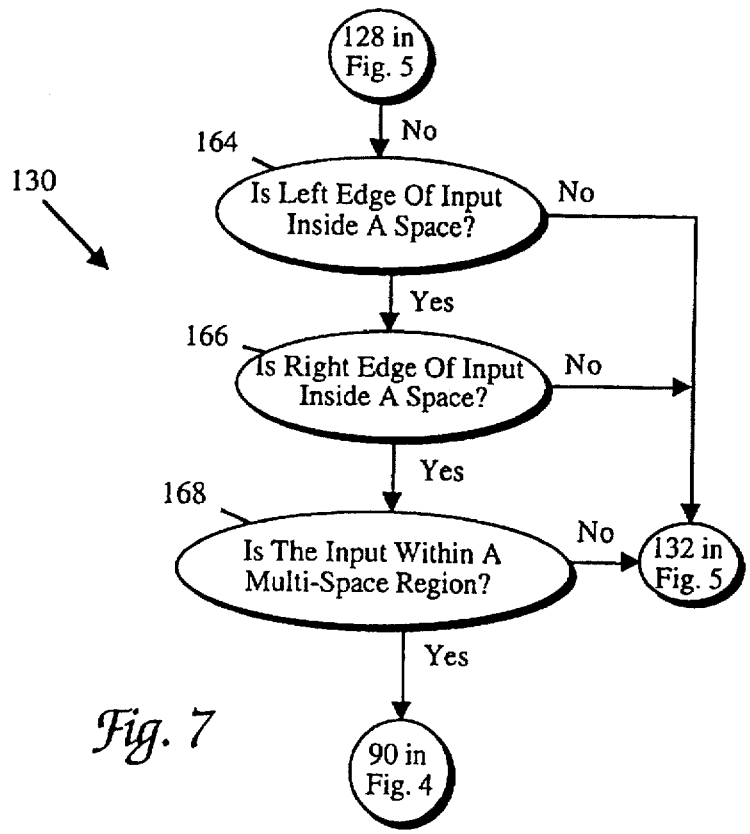
FIG. 7 is a flowchart illustrating the determination of a multi-space overlap (step of FIG. 5)

Referring next to the flowchart of FIG. 7, step 130 (see FIG. 5) which determines if a multi-space region is overlapped will be further described. A multi-space region includes not only multiple consecutive space characters, but also includes carriage returns and tabs. For illustrative purposes, a space character within a series of consecutive space characters ("space") is the chosen example in the following discussion, but the steps are applicable to other multi-space regions as well. Initially in step 164, the logic determines whether the left edge of the input's bounding box is within a space. If so, then the logic moves to step 166 where it determines whether the right edge of the input's bounding box is within a space. If neither the left edge nor the right edge of the input bounding box lies inside a space location as determined in steps 164 and 166, respectively, then the process continues with step 132 of FIG. 5 where the next determination of the input position relative to the existing text is made. If both edges do lie within a space, however, the next determination is made in step 168 as to whether the space(s) the edges lie in are within a multi-space region. If the space(s) are in a multi-space region, then the input is interpreted as a word insertion, which is performed with the continuation of the logic at step 90 in FIG. 4. If the space is not within a multi-space region, then the logic moves to step 132 to further determine the input position.

Figure 8:
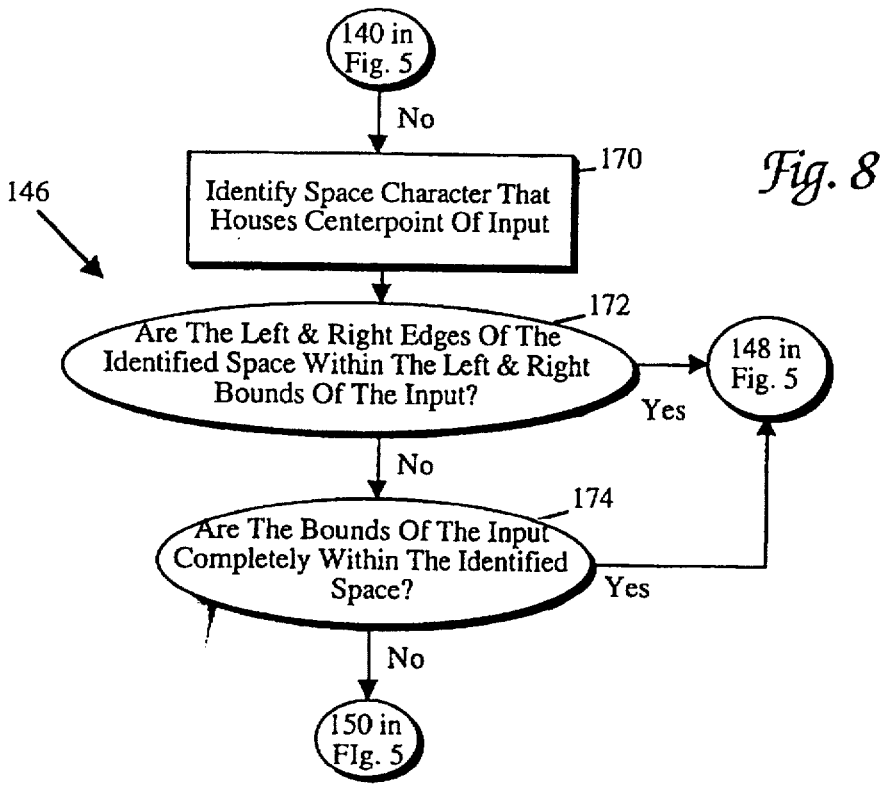
FIG. 8 is a flowchart illustrating substantial overlap of a space character (step 146 of FIG. 5)

Referring next to FIG. 8, the substantial overlapping of a space character determining step 146 of FIG. 5 will be described in more detail. The determination begins in step 170 with the identification of the space character that contains the centerpoint of the input. The following step 172 checks for the position of the edges of the identified space relative to the input centerpoint. If both the right and left edges of the space are within the right and left bounds of the input, then the input is considered to substantially overlap the space and the logic proceeds to step 148 where the insert position is set to the bounded space. Otherwise, the logic flows to step 174 where it determines whether the right and left bounds are within the right and left edges of the space. If so, the input is again considered to substantially overlap the bounding space and the logic again continues with step 148 of FIG. 5 to set the insertion position of the input as the space position. If neither of these conditions holds true, then the process continues with step 150 of FIG. 5.

Once the steps to complete the determination of the intent and placement of the input (88 of FIG. 4) are completed, subsequent steps 92–102 can be performed, as described above.

Figure 9:
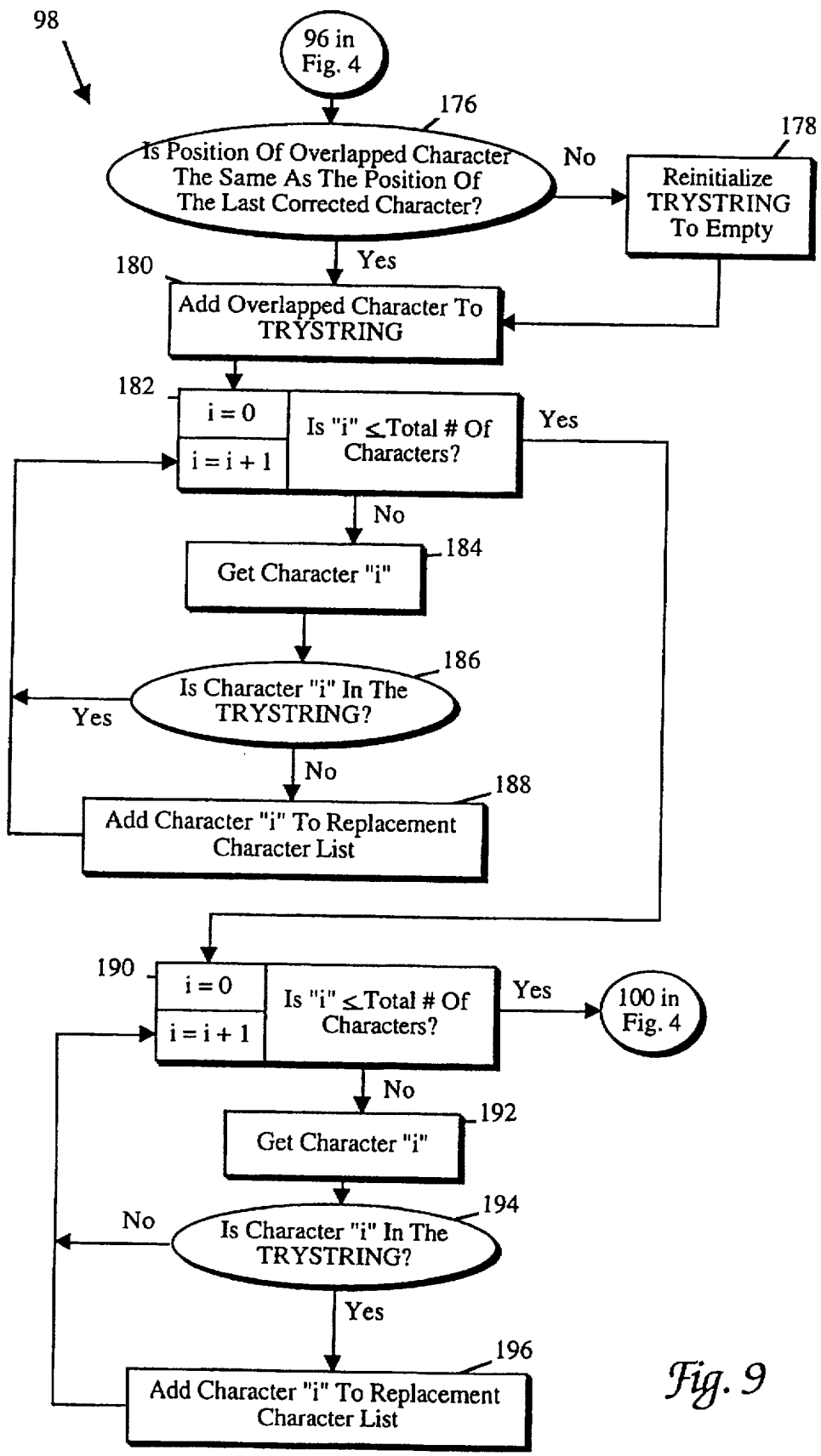
FIG. 9 is a flowchart illustrating the process of determining a list of suitable replacement characters (step 98 of FIG. 4)

Referring next to FIG. 9, the process of determining a list of suitable characters in step 98 is detailed. The insert position at this stage of the logic is an overlapped character position. The process begins in step 176 by determining if the position of the overlapped character is the same position of the last character overwritten. This step is performed to determine if the same character is undergoing repeated correction. If the character is not the same, the list of potential characters (referred to as the TRYSTRING in this description and in the drawings) is reinitialized to be empty in step 178. After reintialization or if the overlapped character is the same, the overlapped character is added to the TRYSTRING in step 180. The iterative series that follow build a prioritized replacement character list based upon the possible replacement characters returned from the recognition engine (76 in FIG. 2c) and the previously corrected entries which are found in the TRYSTRING. The first iterative series begins the loop in step 182 with the "i" variable set to 0. The recognizer provides the most probable character from the possible interpretations of the input as the first character, character 0, in step 184. The next step 186 determines if the character is already in the TRYSTRING. At this point, the TRYSTRING contains at least the currently overlapped character as added in step 180. The TRYSTRING could also contain other characters if the same character position has been consecutively overlapped. If the most probable character, i.e., character 0, is already in the TRYSTRING, that character is not placed in the replacement character list. Thus, although the recognizer considers the first character the most probable replacement character, that character is not given the highest priority for replacing the overlapped character if it is the same as the overlapped character. With reference again to FIG. 2c, the most probable recognized replacement of the "o" was an "o", so it would not be placed in the replacement character list as the most probable replacement since the letter "o" is already in the TRYSTRING (i.e., two characters are the same). If the character "i" is not already in the TRYSTRING, then it is placed in the replacement character list in step 188. This series of steps continues until all the possibilities for the recognizer have been considered. Once each of the possible replacement characters is considered, a second iteration of the possible replacement characters proceeds in steps 190–196. This sequence of steps allows the most probable replacement character as determined by the recognizer to be placed in the replacement character list but as a secondary replacement character. Again using the example of FIG. 2c, the "o" replacement character would be placed in the replacement character list but as a least probable replacement. Once all the characters in the TRYSTRING are added to the replacement character list and the iteration is complete, the process continues with step 100 of FIG. 4.

Figure 10:
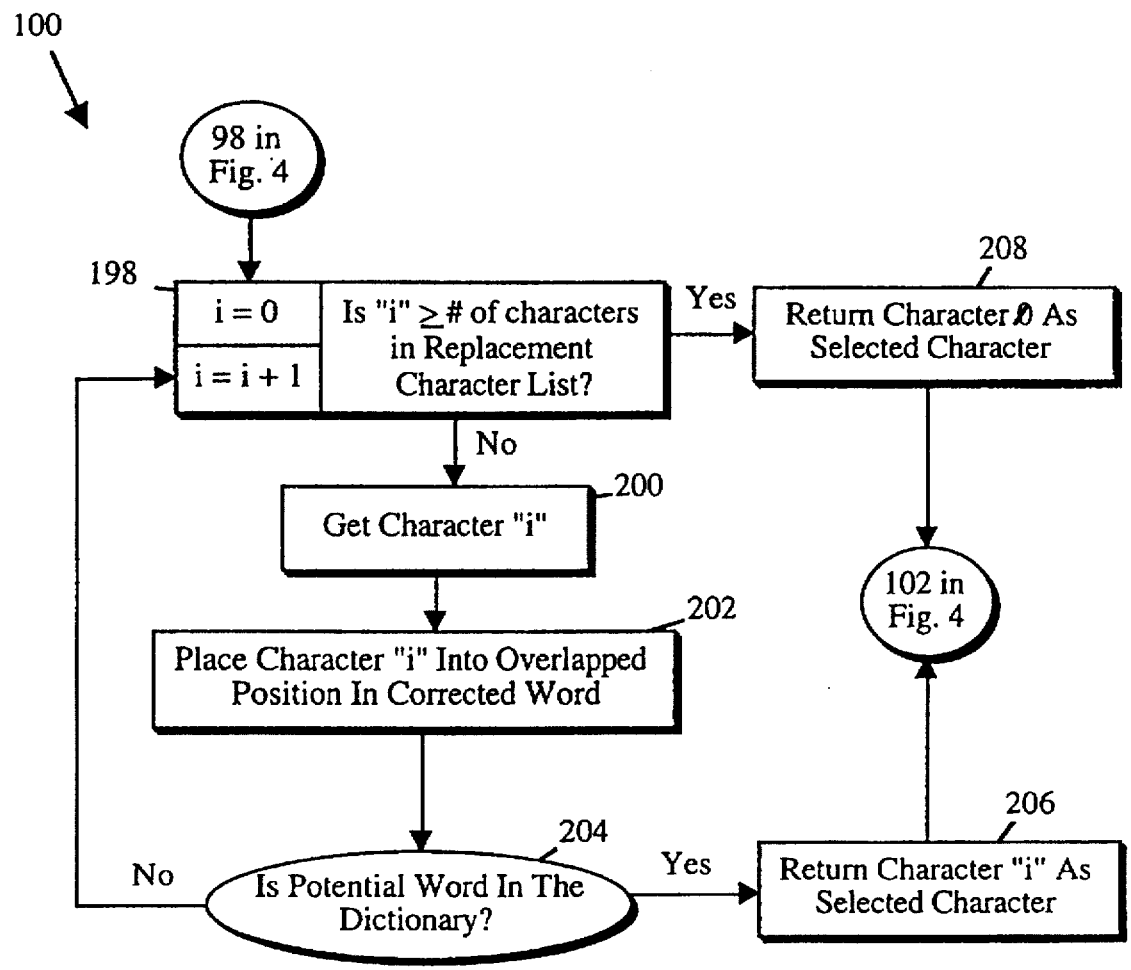
FIG. 10 is a flowchart illustrating the determination of the best replacement character (step 100 of FIG. 4).

With the list of suitable replacement characters completed, the process then proceeds with the determination of the best potential replacement character in step 100, which is detailed in the flowchart of FIG. 10. The determination begins with the loop 198 with the initialization of counter "i" to zero. In step 200, the character corresponding to the current "i" count is acquired from the replacement character list. This character is positioned in the overlapped character position of the corrected word in step 202. The potential word is checked against the "words" in the dictionary in step 204. The dictionary permits dates, numbers, and the like so that potential words including numeric characters can also be overwritten. If the potential word is in the dictionary, then that character is returned as the selected character in step 206 and the process continues with step 102 of FIG. 4. On the other hand, if the word is not found in the dictionary, the logic loops back to step 198 where the counter "i" is incremented by one, and the described steps 200–204 are repeated. Iteration continues until a potential word is found in the dictionary or until there are no more characters to try. If the list of characters is completed without discovering a potential word in the dictionary, (i.e. when in step 208 it is determined that the value "i" is greater than or equal to the number of characters in the replacement character list), the process then returns the first potential character (character "0") of the replacement character list as the selected character in step 208. The first potential character is selected, because it is considered the most probable intended character interpretation for the input based upon the prioritized replacement character list determined in step 100 of FIG. 4. With the placement of the selected character into the corrected word, the process of overwriting a character is completed.

While this invention has been described in terms of several preferred embodiments, there are alterations, permutations, and equivalents which fall within the scope of this invention. It should also be noted that there are many alternative ways of implementing the processes of the present invention. By way of example, the order of the steps in many cases is not critical. Further, as the sophistication of recognition engines increase, the recognizer used in conjunction with the described process may improve sufficiently that the correction can be done on a word basis. It is therefore intended that the following appended claims be interpreted as including all such alterations, permutations, and equivalents as fall within the true spirit and scope of the present invention.

What is claimed is:

1. A method for correcting text objects displayed on a display screen of a pen based computer system, the method comprising the steps of:
   a) receiving an initial input on the display screen corresponding to at least one text object;
   b) recognizing the initial input as said at least one text object having at least one character, wherein the recognized initial input includes a text object bounding box;
   c) receiving an additional input on the display screen such that an additional input bounding box is defined for said additional input that includes at least one character;
   d) determining whether said additional input is intended for overwriting based on an amount the additional input overlaps at least a portion of said text object by determining if there is substantial overlap between said additional input bounding box and said text object bounding box;
   e) re-recognizing the initial input in conjunction with said additional input when it has been determined that the additional input was intended for overwriting;
   f) determining a best potential replacement character of said text object based upon a result of said re-recognizing step; and
   g) correcting said text object using the best potential replacement character result and displaying the result.

2. A method for correcting textual material as recited in claim 1 wherein when it is determined that said additional input is intended for overwriting, it is determined to be a correction gesture, and when more than a predefined number of characters of said text object are overlapped by the additional input, the additional input is treated as a word object insertion gesture as opposed to a correction gesture.

3. A method for correcting textual material as recited in claim 2 wherein the predefined number of overlapped characters is two characters.

4. A method for correcting textual material as recited in claim 2 wherein when the input substantially overlaps a written character and the word correction gesture is recognized, the most overlapped written character is replaced by the additional input.

5. A method for correcting textual material as recited in claim 2 wherein the step of determining the best potential replacement character result includes the substeps of:
   determining whether a most overlapped character is in the same textual position as the last corrected character;
   clearing an attempted character string variable when the most overlapped character is in the same textual position as the last corrected character;
   adding the most overlapped character to the attempted character string variable; and
   creating a replacement list that prioritizes multiple potential interpretations in a re-recognition result based at least in part upon the characters in the attempted character string variable when the re-recognition result has a potential interpretation that is not in the attempted character string variable, wherein the best potential replacement character is selected based at least in part upon the prioritization in the replacement list.

6. A method for correcting textual material as recited in claim 5 wherein the replacement list is formulated by first listing the potential interpretations of the re-recognition result that were not in the attempted character list in the order they were prioritized by a recognizer and then listing the potential interpretations of the re-recognition result that were in the attempted character list in the order they were prioritized by the recognizer.

7. A method for correcting textual material as recited in claim 5 wherein the best potential replacement character is selected by sequentially inserting the characters in the replacement list into the selected word and comparing the resultant word to words in a dictionary means, wherein the first character associated with a resultant word that is found in the dictionary is selected as the best potential replacement character.

8. A method for correcting textual material displayed on a display screen of a pen based computer system, the method comprising the steps of:
   a) receiving an input with a stylus on a dual function display screen of a pen-based computer system;
   b) recognizing the input, the recognition step including the substep of defining a bounding box that bounds the input, wherein the input includes at least one character;
   c) determining whether the input is a word correction gesture, wherein the word correction gesture determining step includes the substeps of,
      determining whether the bounding box of the input substantially overlaps a displayed textual object having at least one character, wherein when them is not substantially overlap, the input is not considered to be a word correction gesture,
      determining whether more than a predetermined number of characters of said displayed textual object are overlapped by the input, wherein when more than the predetermined number of characters are overlapped by a determined amount the input is not considered to be a word correction gesture, determining whether the input is positioned entirely within a multi-space region, wherein when the input is positioned entirely within a multi-space, the input is not considered to be a word correction gesture, d) determining an insertion position for the input and a selected word for correction when the input is determined to be a word correction gesture, wherein the insertion determining step includes the substeps of, selecting the closest adjacent word to the midpoint of the input as the selected word for correction when the midpoint of the input is over a space character and setting the insert position of the input to an adjacent end of the selected word;

selecting the position of a most overlapped textual character as the insertion position when the input substantially overlaps textual characters and selecting the word associated with the most overlapped textual character as the selected word for correction;

e) re-recognizing the input in conjunction with characteristics of the selected word when the input is determined to be a word correction gesture and providing a plurality of potential new interpretations as a result of said re-recognizing;

f) determining a best potential replacement character result based upon a result of said re-recognizing step, by selecting said best potential replacement character as the highest probability of it being the correct replacement character based upon said plurality of potential new interpretations; and g) correcting the selected word using the best potential replacement character result and displaying the result.

9. A method for correcting textual material as recited in claim 8 wherein the step of determining the best potential replacement character result includes the substeps of:

determining whether a most overlapped character element is in the same textual position as the last corrected character;

clearing an attempted character string variable when the most overlapped character element is in the same textual position as the last corrected character;

adding the most overlapped character dement to the attempted character string variable;

creating a replacement list that prioritizes multiple potential interpretations in a re-recognition result wherein the replacement list is formulated by first listing the potential interpretations of the re-recognition result that were not in the attempted character list in the order they were prioritized by the recognizer and then listing the potential interpretations of the re-recognition result that were in the attempted character list in the order they were prioritized by the recognizer; and selecting the best potential replacement character by sequentially inserting the characters in the replacement list into the selected word and comparing the resultant word to words in a dictionary means, wherein the first character associated with a resultant word that is found in the dictionary is selected as the best potential replacement character.

10. In a computer system including a processing means, a display screen controlled by the processing means and a stylus for permitting a user to write on the display screen in order to input information into the processing means, an arrangement for correcting textual material displayed on a computer screen comprising:

means for determining the location of an input written onto the screen by the user;

a recognizer for recognizing the input as a text object including at least one character;

means for determining whether the input is a correction gesture intended to correct a word displayed on the display screen based on a determined amount of overlap of the input written onto the screen over the textual material that is displayed on the screen;

means for causing the recognizer to re-recognize the input in context when the input is determined to be part of a correction gesture, wherein said correction gesture also represents a correction character to replace at least one character of said text object;

means for selecting a particular re-recognition interpretation from a plurality of potential re-recognition interpretations based in part on whether particular interpretations have already been tried; and means for replacing said at least one character of said text object with the selected re-recognition interpretation when a recognized input is determined to be part of a correction gesture.

11. A method of correcting textual material displayed on a display screen of a pen based computer system, the method comprising the steps of:

a) receiving an input on the display screen, wherein the input includes at least one character;

b) initially recognizing the input wherein the initial input recognition identifies a set of potential interpretations, each potential interpretation having a probability associated therewith, wherein the set includes at least one potential interpretation;

c) determining whether the recognized input is a word correction gesture based in part on g determination of whether the recognized input overlaps by a determined mount textual material that is displayed on the screen and if so, determining an insertion position for the recognized input and a selected word for correction;

d) recognizing the input a second time in conjunction with a context of the selected word for correction when the input is determined to be a word correction gesture;

e) determining a best potential replacement character result based at least in part upon a result of said step of recognizing the input in conjunction with a context of the selected word for correction; and f) correcting the selected word using the best potential replacement character result and displaying the result, whereby corrections to textual material displayed on the display screen are made by overwriting the text to be corrected.

12. A method of correcting textual material as recited in claim 11 wherein when more than a predefined number of characters are overlapped by the input, the input is treated as a word insertion gesture as opposed to a correction gesture.

13. A method of correcting textual material as recited in claim 12 wherein the predefined number of overlapped characters is two characters.

14. A method of correcting textual material as recited in claim 11 wherein when the input substantially overlaps a written character and a word correction gesture is recognized, the most overlapped written character is replaced by the input.

15. A method of correcting textual material as recited in claim 14 wherein when a midpoint of the input is over a particular written character, that particular written character is considered the most overlapped character.

16. A method of correcting textual material as recited in claim 11 wherein when a midpoint of the input is over a tab or past the end of a line and the input is determined to be a word correction gesture, the insert position of the input is designated as an adjacent end of the closest adjacent written word.

17. A method of correcting textual material as recited in claim 11 wherein when a midpoint of the input is over a space character and the input is determined to be a word correction gesture, the insert position of the input is designated as an adjacent end of the closest adjacent written word.

18. A method as recited in claim 11 further comprising the steps of:

determining whether a bounding box of the input substantially overlaps a space between sequential words in a textual object; and designating the insertion position as a closest end of an adjacent word when the bounding box of the input substantially overlaps a space between sequential words in the textual object.

19. A method of correcting textual material as recited in claim 11 further including the substeps of:

determining whether a most overlapped character element is in the same textual position as a last input correction character;

clearing a character string variable associated with the input when the most overlapped character element is in the same textual position as the last corrected character;

adding the most overlapped character element to the attempted character string variable; and creating a replacement list that prioritizes multiple potential interpretations in a re-recognition result based at least in part upon the characters in the attempted character string variable when the re-recognition result has a potential interpretation that is not in the attempted character string variable, wherein the best potential replacement character is selected based at least in part upon the prioritization in the replacement list.

20. A method of correcting textual material as recited in claim 19 wherein the replacement list is formulated by first listing the potential interpretations of the result of the step of recognizing the input in conjunction with a context of the selected word for correction that were not in the attempted character list in the order they were prioritized by the recognizer and then listing the potential interpretations of the result of the step of recognizing the input in conjunction with a context of the selected word for correction that were in the attempted character list in the order they were prioritized by the recognizer.

21. A method of correcting textual material as recited in claim 19 wherein the step of recognizing the input in conjunction with a context of the selected word for correction is accomplished by sequentially inserting the characters in the replacement list into the selected word and comparing the resultant word to words in a dictionary, wherein the first character associated with a resultant word that is found in the dictionary is selected as the best potential replacement character.

22. A method as recited in claim 21 wherein when all potential interpretations found in the re-recognition result are also in the attempted character list, the best potential replacement character result is selected to be the top choice of the recognizer.

23. A method of correcting textual material as recited in claim 11 wherein when the input is positioned entirely within a tab, the input is treated as a word insertion as opposed to a correction.

24. A method of correcting textual material as recited in claim 11 wherein when the input is positioned entirely within a multi-space region that includes at least three consecutive spaces, the input is treated as a word insertion as opposed to a correction.

25. A method of correcting textual material as recited in claim 11 wherein:

the recognition step including the substep of defining a bounding box that bounds the input;

the word correction gesture determining step includes the substep of determining whether the bounding box of the input substantially overlaps a displayed textual object, wherein when there is no substantial overlap, the input is not considered to be a word correction gesture.

26. A method of correcting textual material displayed on a display screen of a pen based computer system, the method comprising the steps of:

a) receiving an input on the display screen;

b) recognizing the input, wherein the input recognition identifies a set of potential interpretations, each potential interpretation having a probability associated therewith, wherein the set includes at least one potential interpretation, the recognition step further including the substep of defining a bounding box that bounds the input;

c) determining whether the input is a word correction gesture, wherein the word correction gesture determining step includes the substeps of, determining whether the bounding box of the input substantially overlaps a displayed textual object by a determined amount, wherein when there is no substantial overlap, the input is not considered to be a word correction gesture, determining whether more than a predetermined number of characters are overlapped by the input, wherein when more than the predetermined number of characters are overlapped, the input is not considered to be a word correction gesture, determining whether the input is positioned entirely within a multi-space region, wherein when the input is positioned entirely within a multi-space, the input is not considered to be a word correction gesture, d) determining an insertion position for the input and a selected word for correction when the input is determined to be a word correction gesture, wherein the insertion determining step includes the substeps of, selecting the closest adjacent word to the midpoint of the input as the selected word for correction when the midpoint of the input is over a space character and setting the insert position of the input to an adjacent end of the selected word;

selecting the position of a most overlapped textual character as the insertion position when the input substantially overlaps textual characters and selecting the word associated with the most overlapped textual character as the selected word for correction;

e) re-recognizing the input in conjunction with characteristics of the selected word when the input is determined to be a word correction gesture, the re-recognizing step being arranged to reassign probabilities to the potential interpretations when the probabilities calculated in the re-recognizing step for each potential interpretation differ from the probabilities associated with the potential interpretations of the recognizing step;

f) using the re-recognition results to create at least one resultant word based upon the potential interpretations and comparing the resultant word to words in a dictionary to further facilitate recognition of the input;

g) determining a best potential replacement character result based at least in part upon a result of said resultant word comparing step; and h) correcting the selected word using the best potential replacement character result and displaying the result.

27. A method of correcting textual material as recited in claim 26 further including the substeps of:

determining whether a most overlapped character element is in the same textual position as the last corrected character;

clearing a character string variable associated with the attempted input when the most overlapped character element is in the same textual position as the last corrected character;

adding the most overlapped character element to the attempted character string variable; and creating a replacement list that prioritizes multiple potential interpretations in a re-recognition result wherein the replacement list is formulated by first listing the potential interpretations of the recognition result that were not in the attempted character list in the order they were prioritized by the recognizer and then listing the potential interpretations of the re-recognition result that were in the attempted character list in the order they were prioritized by the recognizer; and wherein the comparing step includes sequentially inserting the characters in the replacement list into the selected word and comparing the resultant word to words in a dictionary, and wherein the first character associated with a resultant word that is found in the dictionary is selected as the best potential replacement character.

28. In a computer system including a processing means, a display screen controlled by the processing means and a stylus for permitting a user to write on the display screen in order to input information into the processing means, an arrangement for correcting textual material displayed on a computer screen comprising:

means for determining the location of an input written onto the screen by the user, wherein the input includes at least one character;

a recognizer for recognizing the input;

means for determining whether the recognized input is a correction gesture intended to correct a word displayed on the display screen based in part on a determined amount of relative overlap of the input written onto the semen and the location where textual material is displayed on the screen;

means for causing the recognizer to re-recognize the input in context with the present textual material, when the input is determined to be part of a correction gesture;

means for selecting a particular re-recognition interpretation from a plurality of potential re-recognition interpretations based in pan on whether particular interpretations have already been tried; and means for replacing an overwritten character with the selected re-recognition interpretation when a recognized input is determined to be part of a correction gesture.

29. A method of correcting existing textual material displayed on a display screen of a pen based computer system, the method comprising the steps of:

a) receiving a handwritten input on the display screen, wherein the input includes at least one character;

b) recognizing the input, wherein the input recognition identifies a set of potential interpretations, each potential interpretation having a probability associated therewith, wherein the set includes at least one potential interpretation;

c) determining whether the recognized handwritten input is a word correction gesture based in part on a determination of whether the input overlaps by a determined amount the existing textual material that is displayed on the screen and if so, determining an insertion position for the input and a selected word for correction; d) re-recognizing the input taking into consideration characteristics of the selected word for correction in conjunction with the set of potential characters when the input is determined to be a word correction gesture to facilitate improved recognition of the input, the re-recognizing step being arranged to reassign probabilities for the potential interpretations when appropriate;

e) determining a best potential replacement character result from the set of potential interpretation based at least in part upon a result of said re-recognizing step; and f) correcting the selected word using the best potential replacement character result and displaying the result, whereby corrections to existing textual material displayed on the display screen we made by overwriting the text to be corrected.

30. A method as recited in claim 29 wherein the characteristics of the selected word taken into consideration in the recognizing step includes a baseline of the selected word.

31. A method as recited in claim 30 wherein the characteristics of the selected word taken into consideration in the re-recognizing step further includes a height of the selected word.

32. A method of correcting textual material displayed on a display screen of a pen based computer system, the method comprising the steps of:

a) receiving a handwritten input on the display screen, wherein the input includes at least one character;

b) recognizing the input, wherein the input recognition identifies a set of potential interpretations, each potential interpretation having a probability associated therewith, wherein the set includes at least one potential interpretation;

c) determining whether the recognized input is a word correction gesture based in part on a determination of whether the input overlaps by a determined mount textual material that is displayed on the screen and if so, determining an insertion position for the input and a selected word for correction;

d) using the potential interpretations to create a set of at least one resultant word and comparing the resultant word set to words in a dictionary when the input is determined to be a word correction gesture to facilitate improved recognition of the input;

e) determining a best potential replacement character result based upon a result of the resultant word comparing step; and f) correcting the selected word using the best potential replacement character result and displaying the result, whereby corrections to textual material displayed on the display screen are made by overwriting the text to be corrected.

33. A method of correcting textual material as recited in claim 32 wherein:

a replacement list is formulated by first listing the potential interpretations that are not previously attempted interpretations of the character being replaced in the order they are prioritized by a recognizer and then listing the potential interpretations that were previously attempted interpretations of the character being replaced in the order they were prioritized by the recognizer; and the replacement list is used to prioritize the potential interpretations used to create the resultant word set.

34. A method of correcting textual material as recited in claim 33 wherein the comparing step is accomplished by sequentially inserting the characters in the replacement list into the selected word and comparing the resultant word to words in a dictionary, wherein the first character associated with a resultant word that is found in the dictionary is selected as the best potential replacement character.

35. A method as recited in claim 33 wherein when all potential interpretations were previously attempted interpretations, the best potential replacement character result is selected to be a top choice of the recognizer.

36. A method of correcting textual material as recited in claim 32 wherein the comparing step is accomplished by sequentially inserting potential interpretations into the selected word and comparing the resultant word to words in a dictionary, wherein the first character associated with a resultant word that is found in the dictionary is selected as the best potential replacement character.

37. A method for correcting textual material as recited in claim 32 wherein the selected word context recognizing step re-recognizes the input in conjunction with characteristics of the selected word for correction when the input is determined to be a word correction gesture, the re-recognizing step being arranged to reassign probabilities to the potential interpretations when the probabilities calculated in the re-recognizing step for each potential interpretation differ from the probabilities associated with the potential interpretations of the recognizing step.

38. A method for correcting textual material as recited in claim 32 wherein the selected word context recognizing step uses the input recognition results to create at least one resultant word based upon the potential interpretations and compares the resultant word to words in a dictionary to further facilitate recognition of the input.

* * * * *

UNITED STATES PATENT AND TRADEMARK OFFICE
CERTIFICATE OF CORRECTION

PATENT NO.   : 5,710,831
DATED        : January 20, 1998
INVENTOR(S)  : Ernest H. Beernink, et al.

It is certified that error appears in the above-identified patent and that said Letters Patent is hereby corrected as shown below:

Claim 8, column 14, line 62, "them" should read --there--.
Claim 8, column 14, line 63, "substantially" should read --substantial--.
Claim 8, column 15, line 2, "amount" should read --amount,--.
Claim 11, column 16, line 34, "g" should read --a--.
Claim 11, column 16, line 36, "mount" should read --amount--.
Claim 27, column 19, line 22, " recognition" should read --re-recognition--.
Claim 28, column 19, line 50, "semen" should read --screen--.
Claim 28, column 19, line 57, "pan" should read --part--.
Claim 29, column 20, line 11, "correction; d)" should read --correction;--.
Claim 29, column 20, line 12, "re-recognizing" should read --d) re-recognizing--.
Claim 30, column 20, line 31, "recognizing" should read --re-recognizing--.
Claim 32, column 20, line 49, "mount" should read --amount--.
Claim 33, column 21, line 2, "are" should read --were--.

Signed and Sealed this

Fifteenth Day of May, 2001

Attest:

NICHOLAS P. GODICI

Attesting Officer    Acting Director of the United States Patent and Trademark Office